United States Patent [19]

Rash et al.

[11] Patent Number: 4,878,238
[45] Date of Patent: Oct. 31, 1989

[54] CORDLESS TELEPHONE NETWORK

[76] Inventors: Mark S. Rash, Route 1, Box 481, Goode, Va. 24556; Nicholas D. Harrison, 2915 Creekwood Rd., Norfolk, Va. 23518; F. Prince Butler, 6127 Beechtree Dr., Alexandria, Va. 22310

[21] Appl. No.: 137,206

[22] Filed: Dec. 23, 1987

[51] Int. Cl.[4] .......................................... H04M 11/00
[52] U.S. Cl. ........................................ 379/62; 379/58
[58] Field of Search ........................ 379/62, 58, 63, 59

[56] References Cited

U.S. PATENT DOCUMENTS

| | | |
|---|---|---|
| 3,366,744 | 1/1968 | Miller . |
| 3,449,750 | 6/1969 | Sweigert . |
| 3,535,689 | 10/1970 | Oden . |
| 3,557,312 | 1/1971 | Vogelman et al. . |
| 4,032,723 | 6/1977 | Mendoza . |
| 4,053,717 | 10/1977 | Snider . |
| 4,291,197 | 9/1981 | Yonaga . |
| 4,679,225 | 7/1987 | Higashiyama ........................ 379/62 |
| 4,700,375 | 10/1987 | Reed ..................................... 379/61 |
| 4,731,812 | 3/1988 | Akerberg .............................. 379/61 |
| 4,736,404 | 4/1988 | Anglikowski et al. ................ 379/62 |
| 4,742,560 | 5/1988 | Arai ...................................... 455/33 |

OTHER PUBLICATIONS

Sony, Cordless Telephone SPP-100.
Electronic Engineering Times, 12-14-87, p. 25, "Britain Offers Digital Cordless Phone Service".
Telecommunications, 1–88(Not Prior Art), pp. 63–67, "The Cordless Connection".
Communications Systems Wordwide, Feb. 1988, pp. 26–28, "Cordless Phones: Out on the Streets", (Not Prior Art).
Federal Communications Commission, 47 CFR Ch 1 (10-1-85 ed.), 815,232, "Interim Frequencies for Cordless Telephones".

*Primary Examiner*—Robert Lev
*Attorney, Agent, or Firm*—Griffin, Branigan & Butler

[57] ABSTRACT

A cordless telephone network comprises a base unit (12) that is interconnected into a normal telephone network (19) and a plurality of hand-held cordless telephones (20). Each of the hand-held cordless telephones has a distinctive identification code and the base unit temporarily stores the identification code of the hand-held unit with which it is communicating during a call and will not communicate with other hand-held units having different identification codes during that call. Each of the hand-held units has the ability to scan a plurality of cordless telephone channels for either receiving a call on a channel on which its identification code is transmitted or placing a call on a channel on which a base unit transmits a "free channel" signal. The hand-held units each have a voice activation/deactivation circuit which allows the hand-held unit to send and receive audio signals only when it has been given permission to do so by a base unit.

7 Claims, 8 Drawing Sheets

CORDLESS TELEPHONE NETWORK

BACKGROUND OF THE INVENTION

This invention relates generally to the art of telephones, and more particularly to a cordless telephone network for enhancing public telephone systems.

As is well known, pay telephones are located at strategic places from which consumers can place calls. A difficulty with the current pay-telephone system is that one must normally be located exactly where a pay telephone is in order to place a call. Often, this is inconvenient since one must get out of his car, for example, to enter a phone booth. Similarly, in most current public telephone systems, it is necessary for telephone companies to make available separate stations, or booths, for each caller and these booths are sometimes uncomfortable and inconvenient, especially when it is raining or the booths are located in crowded or undesirable areas. Further, callers sometimes wish to spread reference papers in front of them while making calls, which is not usually possible in phone booths. Also, it is expensive for telephone companies to provide separate booths and equipment for each caller. It is an object of this invention to provide a public pay telephone system having telephones which allow a caller to remain in a chosen area, such as in his car, while making a call and which do not require telephone companies to provide separate stations for each of the callers.

A related problem to that discussed above is that it is difficult for an individual to receive a call at a public telephone booth. In this respect, a party expecting to receive a call at a public telephone must wait close by the telephone which can often be very inconvenient, especially when others are periodically using the telephone. Such situations are especially impractical for truckers who often must wait by public telephone booths at truck stops waiting for instructions from home offices, when they should be sleeping to prepare themselves for their next run. It is an object of this invention, to allow a called party to receive a call on public telephone systems while "on the go", at locations convenient to the person, such as in his car or truck or at a restaurant booth.

There are currently available cellular telephones which allow users to make and receive calls from cellular telephones located in serviced zones. In this regard, serviced zones are normally located around large metropolitan areas and these zones are divided into cells. If one owns a cellular telephone, and he is located in a serviced zone, he can place and receive calls via a cell antenna and base unit located in each cell. A problem with cellular telephone systems is that they are expensive to maintain and therefore are expensive for the users thereof. In this regard, one must currently pay a substantial monthly use fee as well as a substantial per call fee. Still further, one must pay for long distance toll charges and the cellular equipment is extremely expensive. On top of this, since it is expensive to set up a serviced cellular zone, this is not done, in rural areas. However, it is often desirable to place calls from within ones car, or otherwise "on the go", when one is in remote areas as well as when one is in metropolitan areas. Truck drivers provide a good example of those who often wish to place and receive calls from their trucks in remote areas. Thus, it is an object of this invention to provide a telephone system which allows one to place and receive calls from within motor vehicles or otherwise "on the go", which does not require the investment of relatively large sums of money in equipment, monthly fees, and per call fees for consumers and which does not require the investment of larger sums of money by telephone companies.

In recent years cordless telephones have come into use with which a party can have a base unit connected to a ground line with a transmitter and receiver for communicating with a cordless hand-held unit located up to one thousand feet (1000) away from the base unit. By using the hand-held unit, one can receive calls and place calls via the associated base station. To date, The United States Federal Communications Commission allows ten (10) channels to be used for cordless telephones, each channel having two (2) frequencies, one on which the base unit transmit and the hand-held unit receives and the other on which the hand-held unit transmits and the base unit receives. These channels are as follows:

| TABLE OF CORDLESS TELEPHONE CHANNELS | | |
| --- | --- | --- |
| Channel | Base transmit (MHz) | Hand-held transmit (MHz) |
| 1 | 46.610 | 49.670 |
| 2 | 46.630 | 49.845 |
| 3 | 46.670 | 49.860 |
| 4 | 46.710 | 49.770 |
| 5 | 46.730 | 49.875 |
| 6 | 46.770 | 49.830 |
| 7 | 46.830 | 49.890 |
| 8 | 46.870 | 49.930 |
| 9 | 46.930 | 49.990 |
| 10 | 46.970 | 49.970 |

In order to provide a certain amount of security for calls placed and received on cordless hand-held units a preset security code is normally assigned to a particular base unit and its associated hand-held unit. In this respect, the hand-held unit cannot be rung by a base unit which transmits another security code and, similarly, the base unit will not place a call for a hand-held unit which does not transmit the preset security code. In other words, the base unit and the hand unit are preset to be used one with the other to provide security.

Although current cordless telephones are quite useful in particular situations, their usefulness is unduly restricted. In this respect, one cannot use such a cordless hand-held unit unless he is near one particular base unit, and that is the base unit with which the hand-held unit is purchased or particularly preset to operate. Further, such a prior-art cordless telephone hand set does interfere with transmission of another if a mode switch thereof is moved to an active mode while the other is already having a conversation on.

It is an object of this invention to provide a cordless telephone network which allows each cordless-telephone hand-held unit to be used with any of a plurality of strategically located base stations while yet providing more security than is presently available for each cordless telephone in the network.

SUMMARY

According to principles of this invention, each of a plurality of cordless-telephone hand-held units can be used with any of a plurality of cordless-telephone base units. Such base units are strategically located by telephone companies or others in truck stops, rest areas along interstate highways, convention centers, restaurants, and the like. Each of the base units has a RAM for temporarily storing an identification code of a first hand-held unit with which it is communicating and does not allow other hand-held units, with other identification codes, to receive calls from, or place calls through, that base unit while the base unit is so "captured" by the first hand-held unit. Each of the hand-held units, includes a voice activation/deactivation switch which does not allow voice signals until that particular hand-held unit and a captured base unit have properly "shaken hands". Each hand-held unit in the system has a different identification code.

Yet further, each hand-held unit has the capability of scanning a plurality of cordless telephone channels when it is in modes for both receiving and placing calls; in order to receive its identification code on one of these channels when it is receiving calls, and in order to receive a "channel free" transmission from a nearby base unit when it is placing a call.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention a clear manner.

DESCRIPTION OF THE PREFERRED EMBODIMENT

Figure 1:
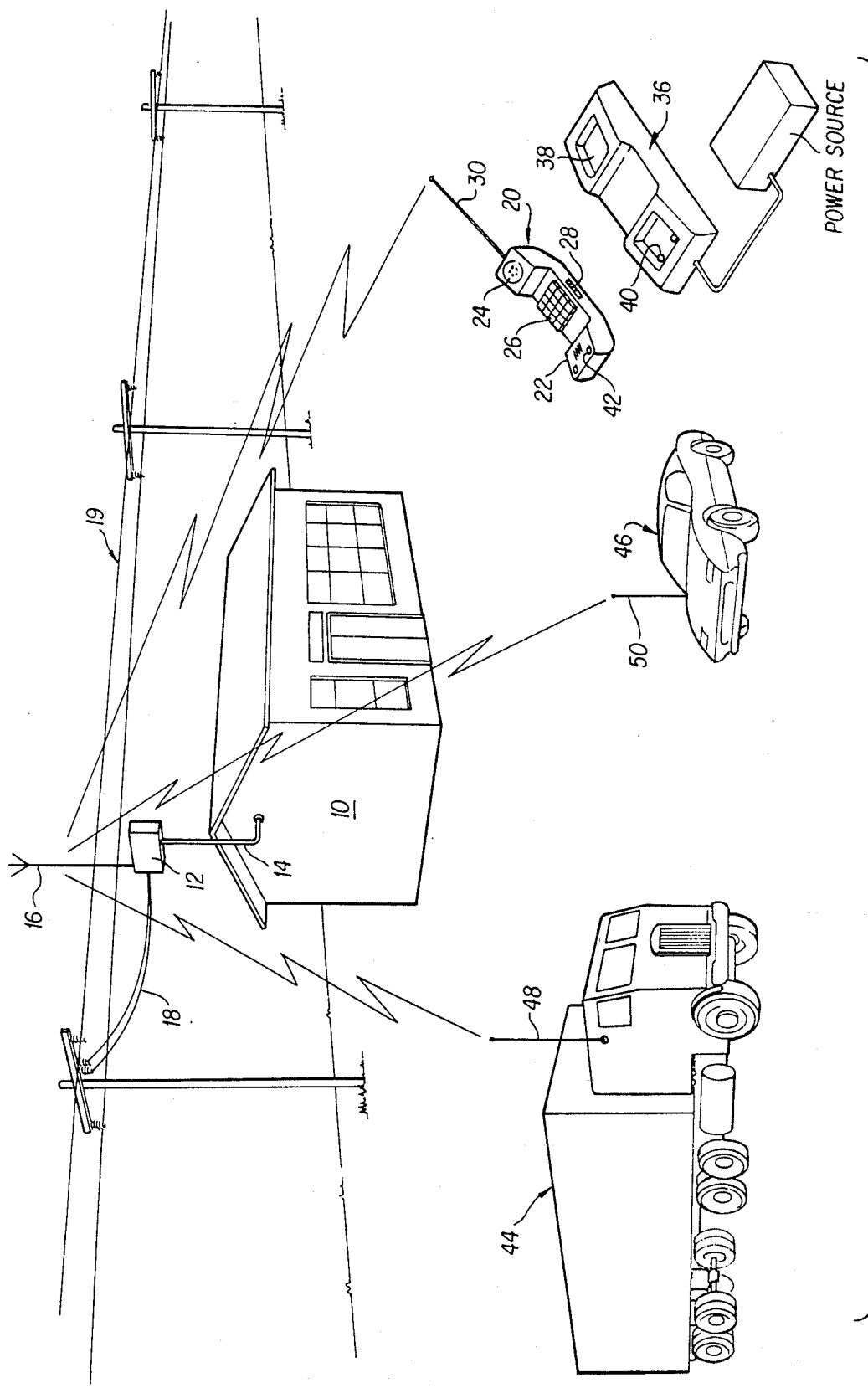
FIG. 1 is a simplified isometric view of a truck stop with a base unit and a plurality of hand units thereat.

Referring now generally to FIG. 1, a truck stop 10 has a base unit (BU) 12 mounted thereat on a pole 14 with an antenna 16. The base unit 12 is mounted in an elevated position in order to prevent vandalism, however, it should be understood that the base unit 12 could be mounted inside the truck stop 10, on the ground, on a telephone pole, or at some other location. The antenna 16 is located high in the air so that it can more easily communicate with trucks, cars, or individuals with hand-held units. The base unit 12 is connected by a ground line 18 to a normal commercial telephone network 19. The network 19 can transmit signals on ground lines satellites or in any other way signals are transmitted on commercial telephone lines. Various mounts for hand-held units are shown in FIG. 1 which are representative of uses of this invention.

A first hand-held unit (HHU) 20 includes a microphone 22 to be placed at a user's mouth, a speaker 24 to be placed at a user's ear, a keyboard 26 with which a user can create touch tones for communicating dialed digits, code numbers, and the like to the base unit 12, and an active/standby switch 28. The first hand-held unit 20 also includes an antenna 30, various circuits 32 (FIG. 3A and B), and a battery 34 (see FIG. 3B also). A receiver unit 36 (FIG. 1) is normally included with each hand-held unit 20. The receiver unit 36 has a cradle 38 for receiving the hand-held unit 20 and various contacts 40 for mating with contacts 42 on the hand-held unit to automatically place the hand-held unit in a stand-by mode and to charge the battery 34 in the hand-held unit when the hand-held unit 20 is cradled on the receiver unit 36.

A second hand-held unit in a truck 44 and a third hand-held unit in an automobile 46 are exactly the same as the first hand-held unit 20 and therefore they are not further described herein, however, each of these hand-held units are connectable to an exterior antenna 48 and 50 so that they can better communicate with the base-unit antenna 16.

With regard to the receiver unit 36, this is connected to a power source which is used to charge the battery 34 in the hand-held unit 20, and such receiver units in the truck 44 and the automobile 46 are attached to the batteries of these vehicles as their power sources. It should be understood that the power source could be built into the receiver unit 36.

Figure 2A:
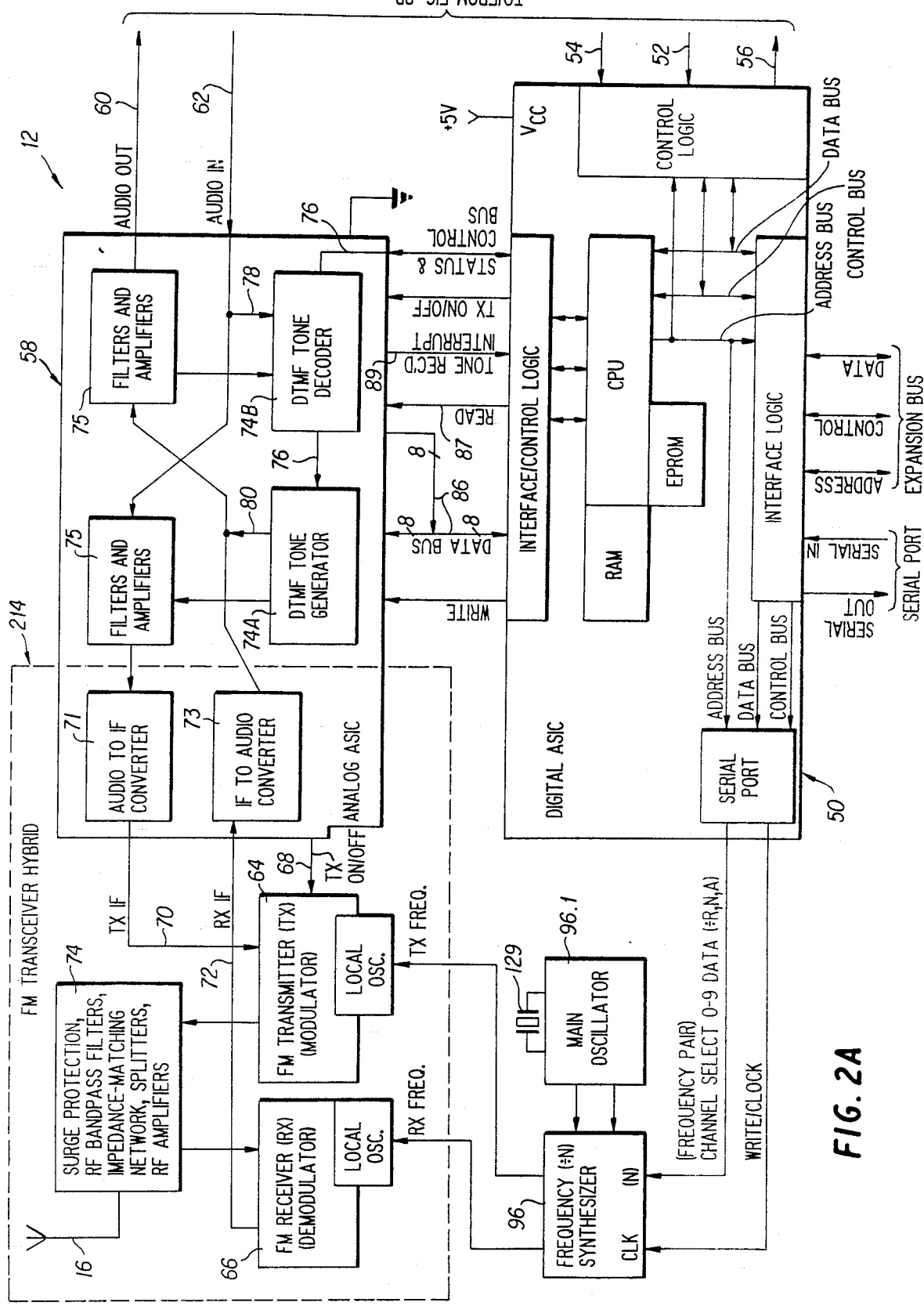
FIGS. 2a–2b are diagrams of a simplified base unit of this invention.
Figure 2B:
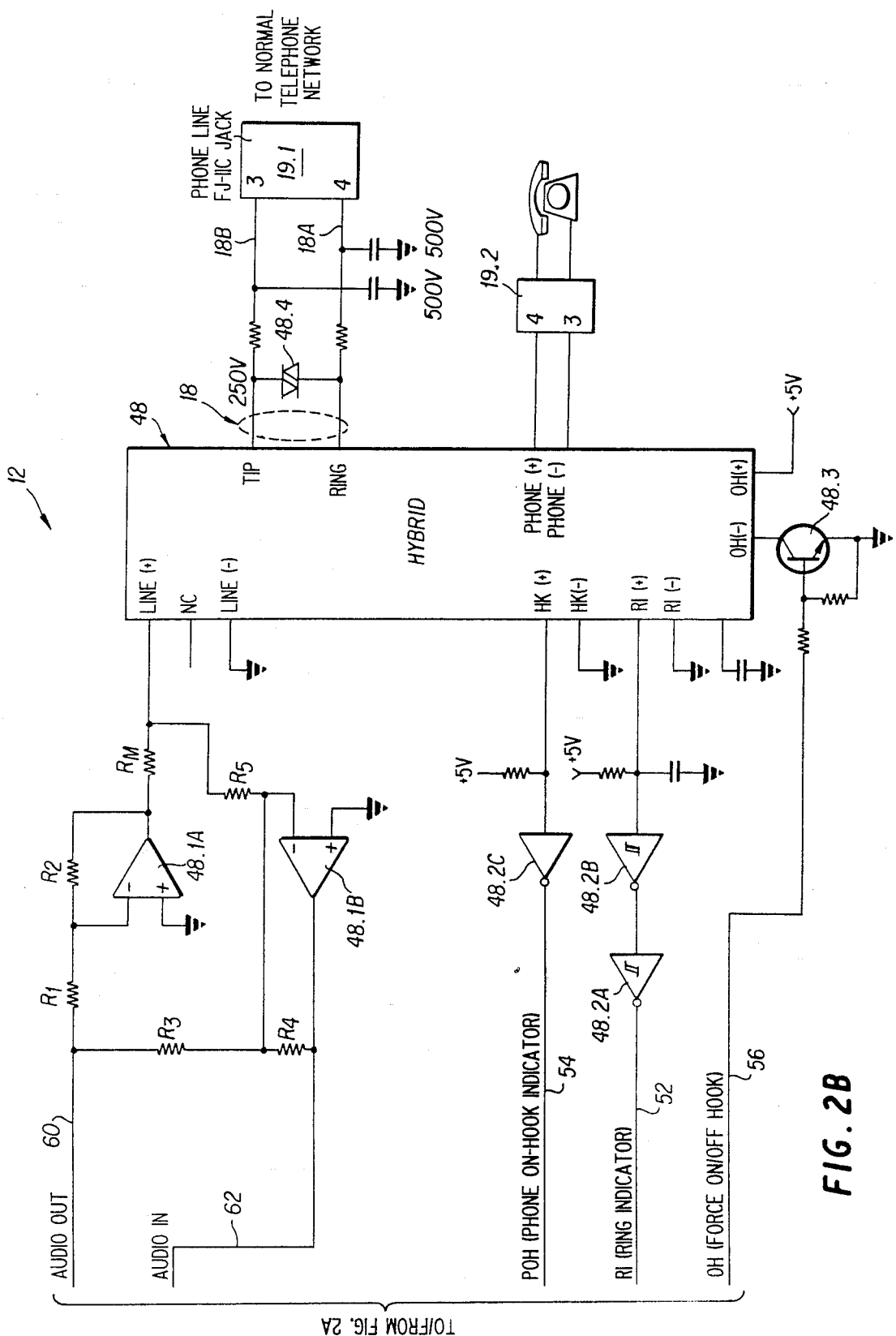

Looking now in more detail at the base unit (BU) 12, with reference to the block diagram of FIG. 2A and B, the ground telephone line 18 includes a ring line 18A and a tip line 18B which are connected to a telephone line interface circuit, or hybrid 48. Basically, the hybrid 48 shapes those signals coming from the base unit 12 over the ring and tip lines 18a and 18b to meet telephone company regulation values of voltage, current and impedance. Such a circuit is sometimes called an impedance matching network. A particular hybrid circuit which will work in this invention is one sold by Cermetek Micro Electronics, Inc., model CH1813.

The hybrid unit 48 is connected to a central logic controller, or BU-CPU 50, over a line 52 on which incoming rings are communicated and a line 54 on which it is indicated that the hybrid has gone "on or off hook". Further, the hybrid 48 is connected to the BU-CPU 50, over a force on/off-hook control line 56, over which the BU-CPU 50 can instruct the hybrid 48 to go "on or off hook".

The hybrid 48 is also connected to a BU analog ASIC circuit 58, which includes amplifiers, modulators, demodulators, AGC circuits, and filters, via voice, or audio, lines 60 and 62. The analog ASIC circuit 58 is connected to a transmitter circuit 64 and a receiver circuit 66 by means of a TX/RX control line 68, and a transmit voice line 70 and a receive voice line 72. The transmitter and receiver circuits 64 and 66 are coupled to the BU antenna 16 via a filter circuit 74 which includes band pass filters and a surge protection hybrid circuit.

The ASIC circuit 58 includes a touch tone generator 74A and a touch tone decoder 74B which are interconnected by a control bus 76. The tone generator 74A and the tone decoder 74B are interconnected to the audio lines 60 and 62 by input and output tone lines 78 and 80. The ASIC circuit 58 also includes filter and amplifier circuits 75 in the audio lines 60 and 62.

The BU-CPU 50 is connected to the ASIC circuit 58 by a status and control bus 76 and a data bus 86.

The BU-CPU 50 is also coupled to the FM receiver 66 and the FM transmitter 64 via a frequency synthesizer, or tuner, 96. Other peripheral elements of the base unit will be described below in relation to operation of the overall system.

Figure 3A:
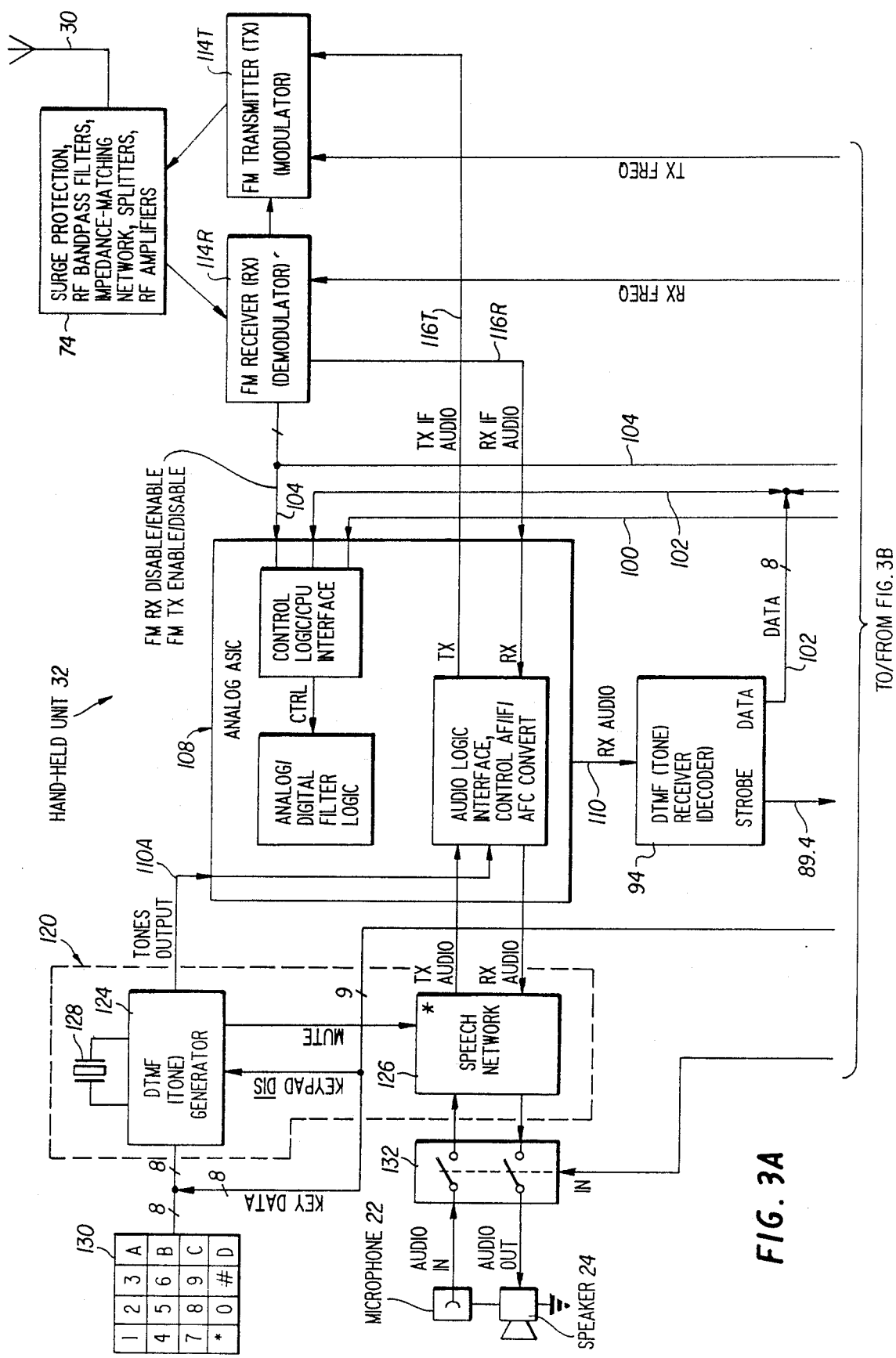
FIGS. 3a–3b are diagrams of a simplified hand-held unit of this invention.

Looking now in detail at the hand-held unit 32 shown in the block diagram of FIG. 3A and B, the battery 34 is coupled to a converter 90 which provides the various DC voltages and ground to operate the various elements of the circuit. With regard to the rest of the circuit, this circuit is basically controlled by a HHU-CPU 92 which includes the necessary RAM 92A and EPROM 92B. The HHU-CPU 92 is coupled to a touch tone DTMF decoder 94, encoder 124, and a digital tuner (PLL Frequency Synthesizer ) 96 via a digital ASIC circuit 98 over address bus 100, data bus 102, and control bus 104. The HHU-CPU 92 is also coupled to the active/standby switch 28 over the address and data buses 100 and 102 via an address decode and data latch logic circuit 106 of the digital ASIC circuit 98. The touch tone DTMF/decoder 94 and encoder 124 are coupled to an ANALOG ASIC circuit 108 on audio lines 110 and 110A respectively. The digital ASIC circuit 98 is attached to a TX/RX driver amplifier circuits 114T and R by means of transmitting receiving control and data bus line 116T and R. The TX/RX driver amplifier circuits 114T and R receive and transmit a radio frequency signals on the HHU antenna 80 to the BU antenna 16.

The ANALOG ASIC circuit 108 is coupled to a telephone speech network and tone dialer 120 which could be of the type sold by Motorola under the model number MC34013A. This telephone speech network 120 includes a line voltage regulator (not shown), the dual tone multi-frequency generator 124, and a speech network 126. It should be understood that the DTMF generator 124 includes a necessary resonator 128 and keypad 130, and is interfaced to the CPU Data Bus 102 by keypad logic 131 of the digital ASIC 98. The speech network 126 is coupled to the microphone 22 and the speaker 24 of the hand-held unit 20 shown in FIG. 1 via an analog switch 132. The analog switch 132 is controlled via the voice enable/disable control line 104.1 by the HHU-CPU 92 and the digital ASIC 98. An analog switch 132 which would work is part #DG305A of Siliconix Corp, Sunnyvale, Calif.

Also attached to the HHU-CPU 92 via the DIGITAL ASIC's address decode and data logic are the ringer control line 104.2, a local ringer 134 and its driver 136, and the DTMF generator 124.

OPERATION

The operation of a cordless telephone network of this invention will be described with reference to the flow charts of FIGS. 4A, B and C, referring to the hardware diagrams of FIGS. 1–3B where necessary.

Figure 4A:
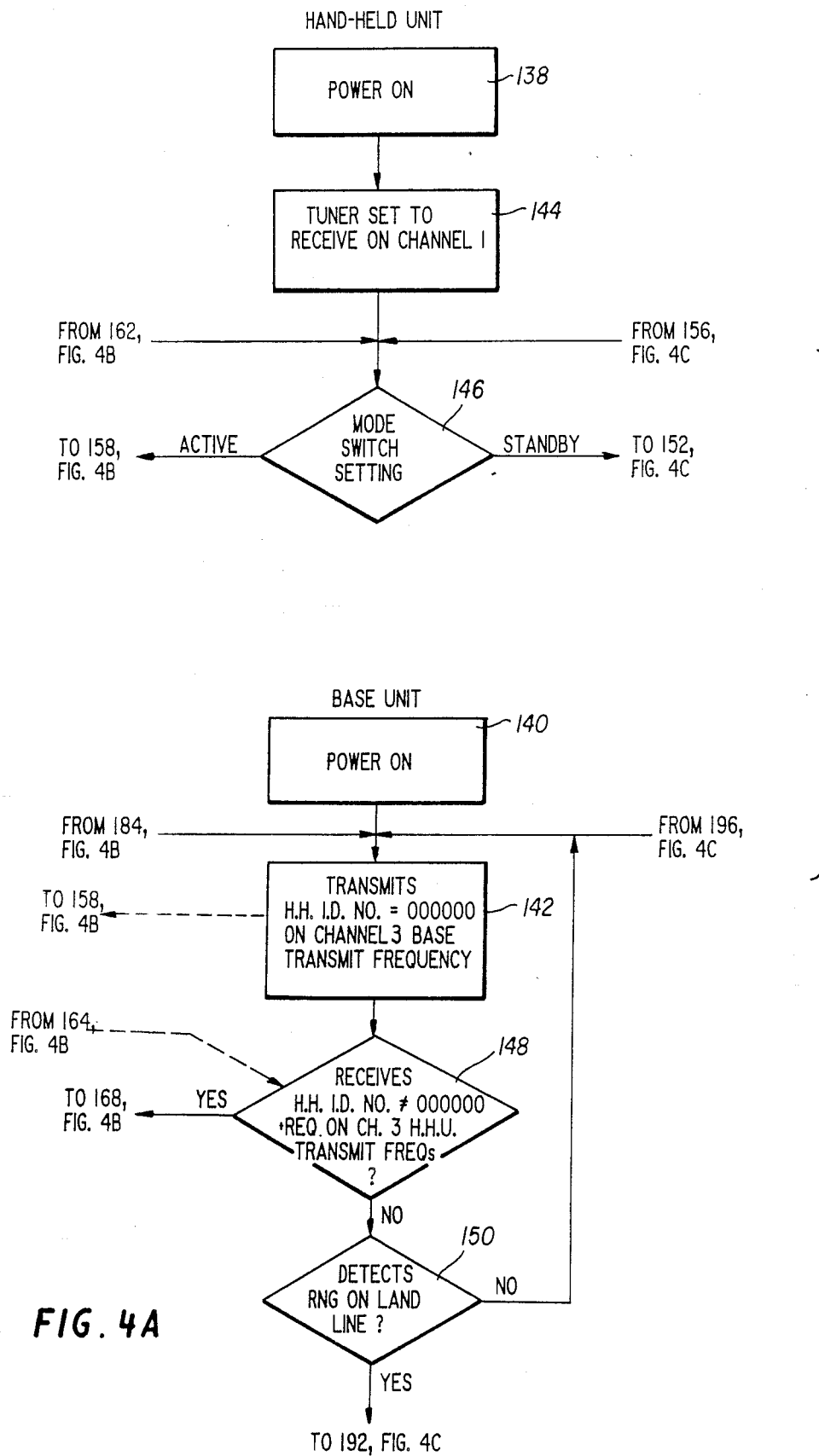
FIGS. 4a–4c are flow charts of the operation of the base unit and hand-held unit of FIGS. 2 and 3.

Referring now to FIG. 4A, the power is turned on at the hand-held unit at block 138 and, at block 140 for the base unit. The BU-CPU 50 (FIG. 2A) controls the touch tone generator 74A to periodically generate touch tones signals of 00000000 which are operated on by the analog ASIC 58 to be transmitted by the transmitter 64 over a base-transmit radio frequency of an assigned cordless telephone channel to radiate from the BU antenna 16. This is shown at block 142 in FIG. 4A. In this discussion it will be arbitrarily assumed that the base unit of FIG. 2 is operating on cordless-telephone channel 3 shown in the TABLE OF CORDLESS TELEPHONE CHANNELS shown above, thus, it transmits on 46.670 MHz and receives on 49.860 MHZ.

Figure 3B:
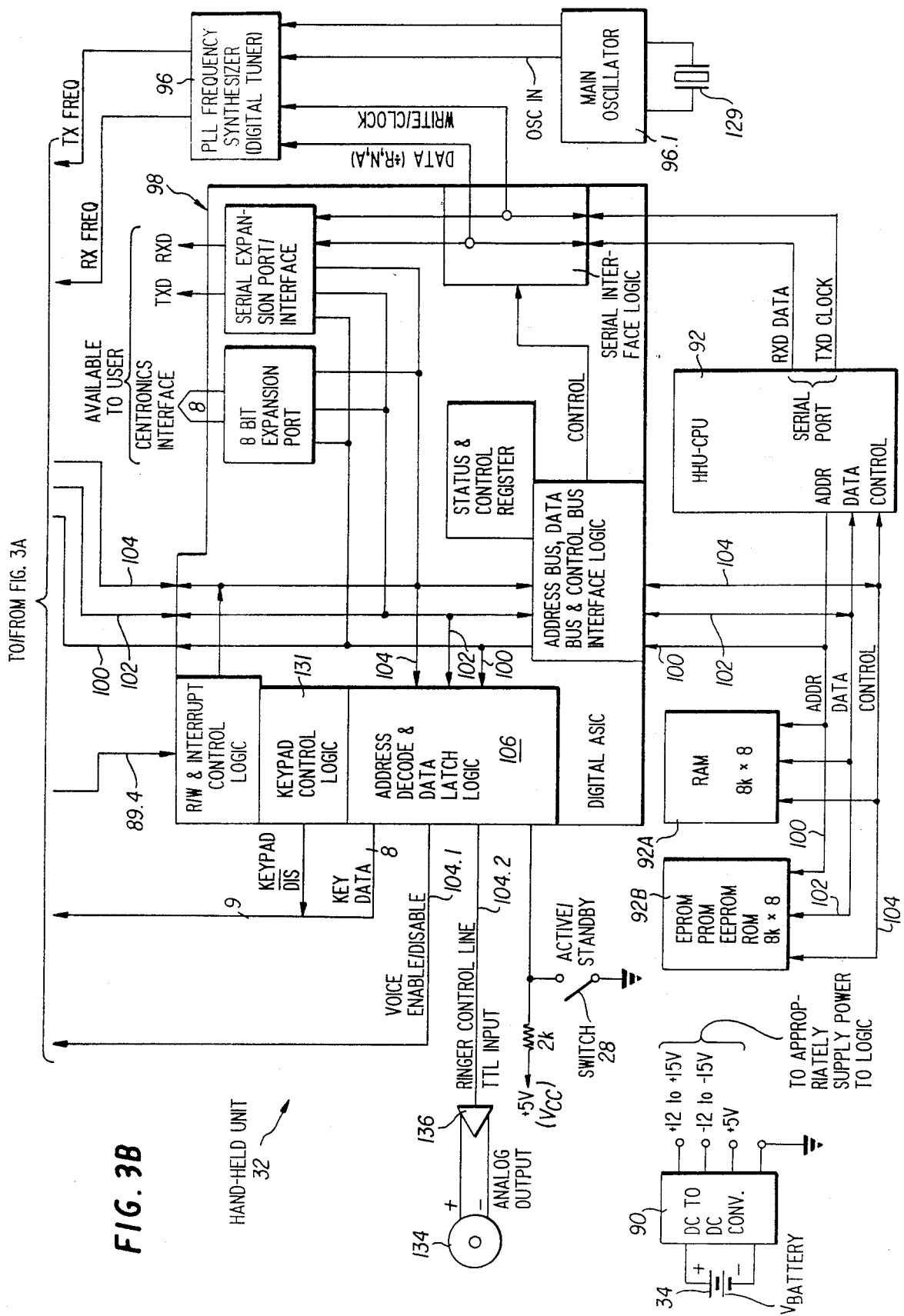

When the hand-held unit (HHU) is turned on, its CPU 92, FIG. 3B, sets the digital tuner (PLL frequency synthesizer) 96 to control the FM transmitter 114T and receiver 114R so that these units receive and transmit the radio frequency of channel 1 (see the TABLE OF CORDLESS TELEPHONE CHANNELS shown above) as is depicted by block 144 in FIG. 4A. The HHU mode switch setting at block 146 in FIG. 4A is normally on standby when the HHU is turned on. Both the hand-held unit and the base unit are now active with the base unit transmitting a series of 0's at block 142 over transmit frequency 46.670 MHZ, monitoring signals coming in over frequency 49.860 MHz channel 3 (hand-held unit transmit frequency for channel 3) at block 148 and monitoring for a ring on the land line 18 at block 150. At the same time, the hand-held unit, which is set to standby, is "listening" with its antenna 118 for its ID number plus a request signal at block 152 on the flow chart on channel 1 and if it does not receive such a signal on channel 1 within a specific length of time, at time-out block 154, the HHU-CPU 92 controls the digital tuner 96 to increment the switch to transmit and receive on the base transmit and receive frequencies of channel 2, which are 49.845 MHZ and 46.630 MHZ respectfully, as indicated at block 156.

PLACING A CALL FROM HAND-HELD UNIT

Figure 4B:
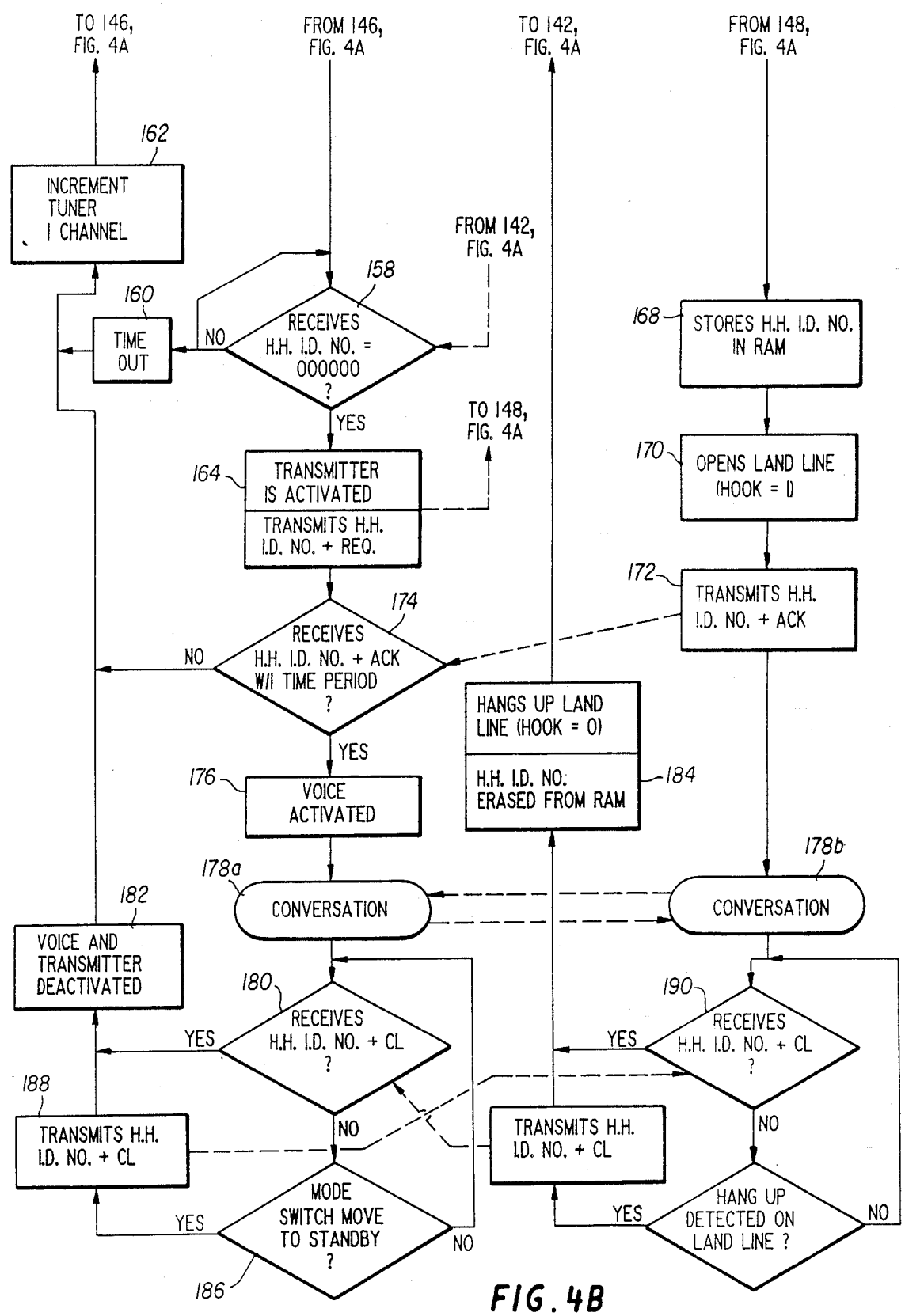

In order to place a call from the hand-held unit the mode switch 28 is set to active at block 146 of FIG. 4A and the HHU-CPU 92 is made aware of this via the digital ASIC 98 over the data line 102. The HHU-CPU 92 listens for reception of a hand-held unit ID number of 00000000 over the base unit transmit frequency of the channel that is then being monitored at block 158 If no channel is received within a time out period at block 160 the channel is incremented at block 162 by the CPU 92 and the new hand-held unit receive frequency is monitored at block 158. If the hand-held operator does not receive a signal indicating that a free channel was found, he moves the active/standby switch back to standby. However, if when the hand-held unit is incrementing through the channels at blocks 158–162 it receives, from a base unit, a hand-held ID of 00000000 over audio line 116R, such as on channel 3, the CPU 92 instructs the DTMF generator 124 of the hand-held unit to transmit the hand-held unit's ID number plus a request signal at block 164. This signal is transmitted over audio line 116T, and transmitted via the hand-held antenna 30 on the hand-held unit frequency 49.860 MHz for channel 3 on which the hand-held unit received a free channel signal. The BU-CPU 50 receives this hand-held ID number plus a request signal at block 148 and stores the ID number in its RAM at block 168. As can be seen in FIG. 2A, the received signal flows from antenna 16 to thru RF filter/impedance network 74, to the FM receiver 66, thru the RX IF line 72, to the IF to audio converter 73, thru the filters and amplifiers 75 to the DTMF tone decoder 74B which decodes the signal producing the received hand-held ID number plus a request. This decoded signal is read by the BU-CPU 50 via the data bus 86 when a READ line 87 is activated by the BU-CPU 50, after the BU-CPU 50 has been interrupted on a tone received interrupt line 89. The BU-CPU 50 then instructs the hybrid 48 on line 56 to go "off hook" on the tip and ring telephone lines 18 at block 170. The BU-CPU 50 then instructs the dial tone generator 74A to create dial tones representative of the HHU ID number, which the base unit just received and temporarily stored, plus an acknowledge signal and this composite signal is transmitted over the base unit transmit frequency for channel 3 (46.670 MHZ) at block 172. The hand-held unit receiver, which is receiving the base unit transmit frequency of channel 3 receives its hand-held ID and the acknowledge signal at block 174 which is decoded by the DTMF decoder 94 and noted by the HHU-CPU 92. The HHU-CPU 92, acting via the control bus 104 and line 104.1, activates the analog switch 132 which enables the microphone 22 and the speaker 24 to transmit via the speech network 126. At this point, the base unit transmitter and receiver 64 and 66 are both operating respectively on the channel 3 frequencies 46.670 and 49.860 MHz as are the receiver and transmitter, respectively, in the circuit of 108 for the hand-held unit. The hand-held unit operator can then dial a number using the keypad 130 which is transmitted directly through the voice lines 60 and 62 of the base unit to the telephone lines 18. The hand-held operator listens for an answer and upon receiving one has a conversation at blocks 178a and b of FIG. 4B. If during this conversation the party at the other end of telephone lines 18 should hang up, this would be detected by the hybrid circuit 48 and signaled to the BU-CPU 50 on hook-data line 54. The BU-CPU 50, would, via data bus 86, control the tone generator 74A to send tone signals via the ASIC circuit 58, the transmitter 64, and the base unit antenna 30, to the hand-held unit and these dial tones are decoded by the dial tone decoder 94 and this data is provided to the HHU-CPU 92. The HHU-CPU 92, upon receiving these signals (HHU ID#plus a "clear" signal) at block 180 (FIG. 4B) operates the analog switch 132 (FIG. 3A) to deactivate the microphone 22 and the receiver 24 at block 182 of FIG. 4B. The HHU-CPU activates on control bus 104 the digital tuner 96 to increment the tuner one channel (to channel 4) at block 162 and, since the mode switch is still set at active at block 146, the hand-held unit again listens for a clear channel (one with the base unit transmitting a frequency of 0's on channel 4). If the mode switch is set to standby block 146, the hand-held unit and the base unit go back into the original standby mode that existed when these units were first turned on.

In this regard, while the hand-held unit is having its voice deactivated at block 182, the base unit CPU 50 is erasing the hand-held ID which was temporarily stored on its RAM at block 184 and is instructing the hybrid 48 on control line 56 to hang up (hook on) on telephone lines 18. The base unit CPU 50 then again instructs the digital tone generator 74A to transmit a channel clear signal, a series of eight (8) 0's, on its fixed channel 3 base-unit transmit frequency indicating to all users that Channel 3 is now available (free). At block 142 both the base unit and the hand-held unit are now back in the standby mode.

Assuming, however, that the first one to hangup is the hand-held unit (by moving the mode switch to standby at block 186), the hand-held unit then transmits the hand-held units ID number and a clearance signal at block 188 which the base unit receives at block 190. Again, as can be seen on the flow chart, the HHU-CPU deactivates the voice at block 182 increments the tuner one channel at block 162 and returns to the standby mode. While the hand-held unit is doing this, the BU-CPU 50 is erasing the hand-held unit's serial number which has temporarily been stored in RAM at block 184 and hangs up on the land line, thereby also returning to the standby mode in which it transmits a free channel signal at block 142, etc.

RECEIVING A CALL FROM LAND LINE

Figure 4C:
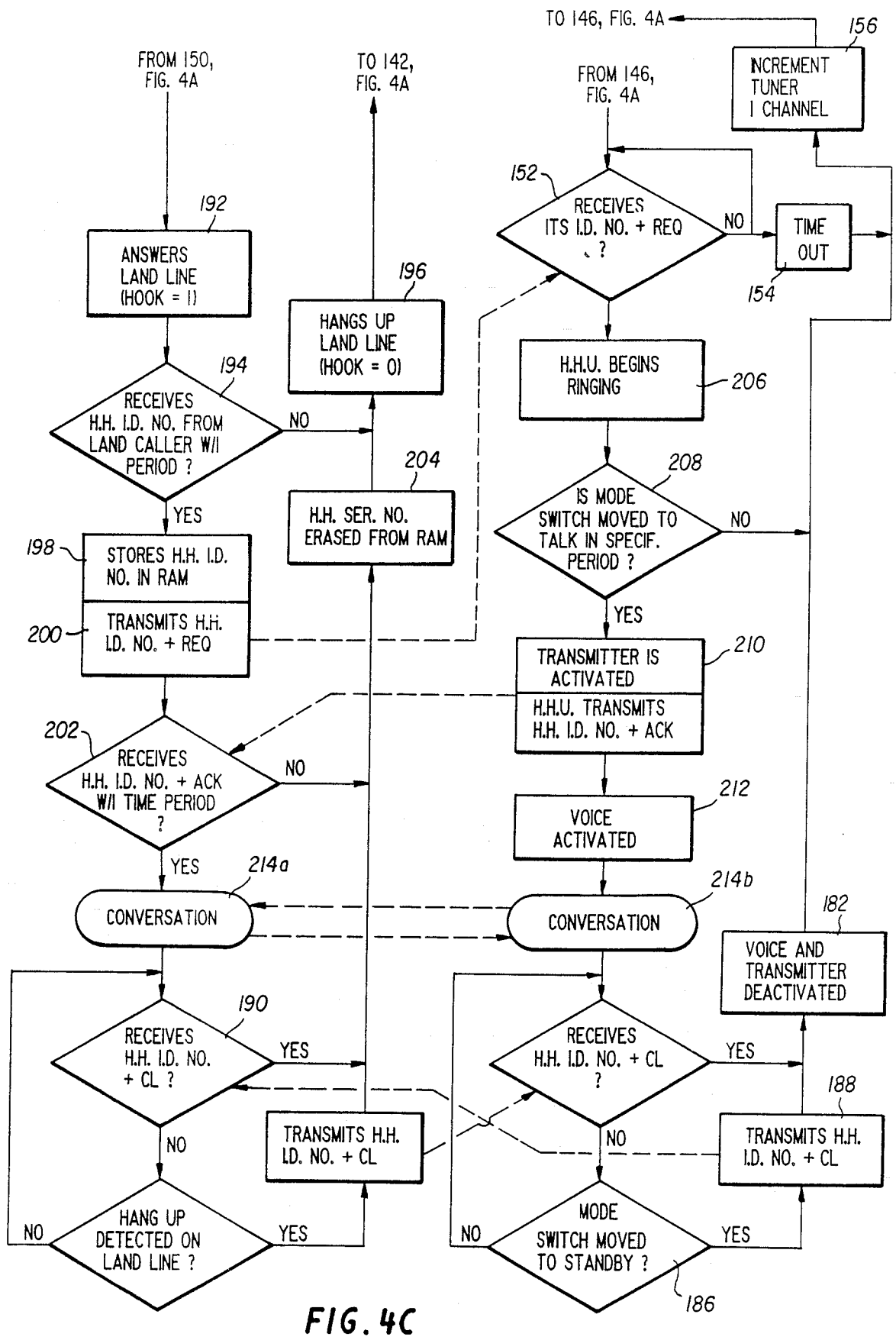

A call received from the land line is initiated when the hybrid 48 (FIG. 2B) detects a ring at block 150 in FIG. 4A and so instructs the BU-CPU 50 (FIG. 2A). The BU-CPU 50 instructs the hybrid on line 56 to go "off hook" or, answer as indicated by block 192 in FIG. 4C. The BU-CPU 50 then monitors (using the DTMF Decoder 74b) dial tones received over telephone lines 18 and any hand-held ID number is temporarily stored by the BU-CPU 50 in RAM at block 194. If no hand-held unit ID number is received the base unit returns to the standby mode hanging up at hybrid 48, see block 196. However, should the BU-CPU 50 receive a HHU ID number from the land caller, it stores this temporarily in its RAM at 198 and instructs the dial tone generator 74A to generate the hand-held unit ID number plus a request which is transmitted at block 200 of FIG. 4C. If the hand-held unit called is in the standby mode it receives this ID number plus the request signal at block 152 but if it is in the active mode, its ID number plus a request signal will have no effect on it and the base unit will receive no acknowledgement within a set period at block 202 and the BU-CPU 50 erases the hand-held serial number from its RAM at block 204 and orders the hybrid to hang up the land line at block 196, thereby returning to a standby mode. However, if the hand-held unit is in a standby mode the HHU-CPU 92, upon receiving the hand-held unit ID number plus a request activates the ringer 134 on control bus 104 to begin periodically ringing at block 206. If the mode switch 28 is moved to the talk position within a specific period, as detected by the HHU-CPU 92, see block 208 of FIG. 4d, the HHU-CPU 92 will activate the transmitter TX of the hand-held unit and will operate the DTMF generator 194 to provide the hand-held ID number plus an acknowledge signal which is transmitted by the hand-held antenna 118 at block 210 of FIG. 4C. At this point, the HHU-CPU 92 activates the analog switch 132 so that the microphone 22 and speaker 24 can be used, see block 212 of FIG. 4C. The base unit receives the hand-held ID number and acknowledge signal at block 202 of FIG. 4 and at this time a conversation can take place as indicated by blocks 214a and 214b. Thereafter, either the party at the end of the telephone line or the hand-held unit operator can hang up and the hang up sequence is exactly the same as was previously described above. All blocks on FIG. 4C having identical functions have identical reference numerals.

It will be appreciated that because of the safeguards built into this system it is possible to have a base unit function with a number of different hand-held units. Such safeguards include:

1. having mechanism on the hand-held units which allow the hand-held units to only transmit once they have received either their particular ID numbers when they are in the standby mode and a channel clear signal when they are in the active mode;

2. having mechanisms on the hand-held units which deactivate their microphones and speakers until the CPU's have fully determined that a conversation can take place; and 3. mechanisms in the base unit for temporarily storing the hand-held units ID number in a RAM to only allow that hand-held unit to receive and send commands to and from the base unit during a conversation and then to erase the hand-held unit ID number from RAM once the call is completed.

With the system of this invention, it is possible to place a base unit at any location and anyone having a hand-held unit can then place and receive calls through that base unit from their car or some other remote area close to the base unit.

While the invention has been particularly shown and described with reference to a preferred embodiment, it will be understood by those skilled in the art that various changes in form and detail may be made therein without departing from the spirit and scope of the invention.

For example, it would be possible to have at one location multiple base units, each one being attached to a different land line and each one operating on a cordless phone channel. If this were done, it would be necessary to insure that none of the base units are operating on the same channel. It would also be possible to allow the base units to move to channels which are free of interference, however, if this were done, it would be necessary to have a system CPU for controlling the various base units to ensure that none of them are operating on the same channel.

Yet another possibility is for the BU-CPU 50 to maintain a TABLE OF USERS, and only allow those hand units having specific ID's set on the TABLE OF USERS to place and receive calls through that base unit. In this manner, a truck stop could maintain a base unit and require hand-held users to check in and pay money in order to get their ID numbers on the table of the BU-CPU. A system could be worked out in which a hand-held unit ID number is enclosed on a label, card, token, or cassette which is plugged into a base unit and a hand-held user would then have to pay money in order to plug his token in and would have to retrieve his token upon leaving. It would also be possible to have the base unit provide voice messages to callers to properly orient land-line telephone callers and explain to them when and how to key in ID codes of hand-held users.

Still further, it would be possible to have an LED read out on the hand-held units indicating signal strength and channel availability.

Also, a FM transceiver hybrid circuit could be used which includes some elements of the ASIC circuit 58 as is indicated by dashed line 214 in FIG. 2.

The embodiments of the invention in which an exclusive property or privilege are claimed are defined as follows:

1. A cordless telephone network comprising:
a base unit that is interconnected into a normal telephone network by at least one telephone line for making connection with said telephone line upon receiving a call from said telephone line or upon being requested to do so by a hand-held unit, said base unit including a base unit cordless transmitter/receiver means for cordlessly communicating two-way calls between said at least one telephone line and any one of a plurality of hand-held cordless telephones, said base unit including a temporary memory means therein for receiving a distinctive identifying signal of a hand-held cordless telephone to be communicated with for each call upon initiation of said call by either said telephone line or said hand held unit and storing said distinctive identifying signal in said temporary memory thereof during said call, said base unit and said hand-held cordless telephone communicating with one another using cordless waves having a power range of only around 1,000 feet or less on only cordless telephone channels, said base unit including a monitoring means for monitoring a cordless wave channel on which said hand-held unit is operating during said call, allowing only a hand-held cordless telephone emitting said temporarily memorized identifying signal in combination with a ring signal or hang up signal to respectively communicate said ring or hang up signal to said at least one telephone line, said base unit only emitting ring signals and hang up signals to said hand-held unit during said call in combination with said distinctive identifying signal, said base unit including means for erasing said distinctive identifying signal from said temporary memory upon completion of said call thereby freeing said base unit for communicating ring signals between another one of said plurality of said hand-held cordless telephones and said at least one telephone line.

2. A cordless telephone network as in claim 1, wherein each of said hand-held units has a distinctive identifying signal in a permanent memory thereof and transmits said distinctive identifying signal to said base unit along with all commands transmitted to said base unit.

3. A cordless telephone network as in claim 2, wherein each of said hand-held units includes a means for scanning a plurality of cordless-telephone channels to find a free channel for initiating a call and to find its identification code when waiting for a call.

4. A cordless telephone network as in claim 3, wherein said scan means includes means scanning all available cordless-telephone channels.

5. A cordless telephone network as in claim 4, wherein each of said hand-held units includes a voice activation circuit means for allowing a microphone and speaker thereof to be activated only after the hand-held unit receives its identifying signal transmitted to it from the base unit.

6. A cordless telephone network as in claim 3, wherein each of said hand-held units includes a voice activation circuit means for allowing a microphone and speaker thereof to be activated only after the hand-held unit receives its identifying signal transmitted to it from the base unit.

7. A cordless telephone network as in claim 2, wherein each of said hand-held units includes a voice activation circuit means for allowing a microphone and speaker thereof to be activated only after the hand-held unit receives its identifying signal transmitted to it from the base unit.

* * * * *